UNITED STATES PATENT OFFICE.

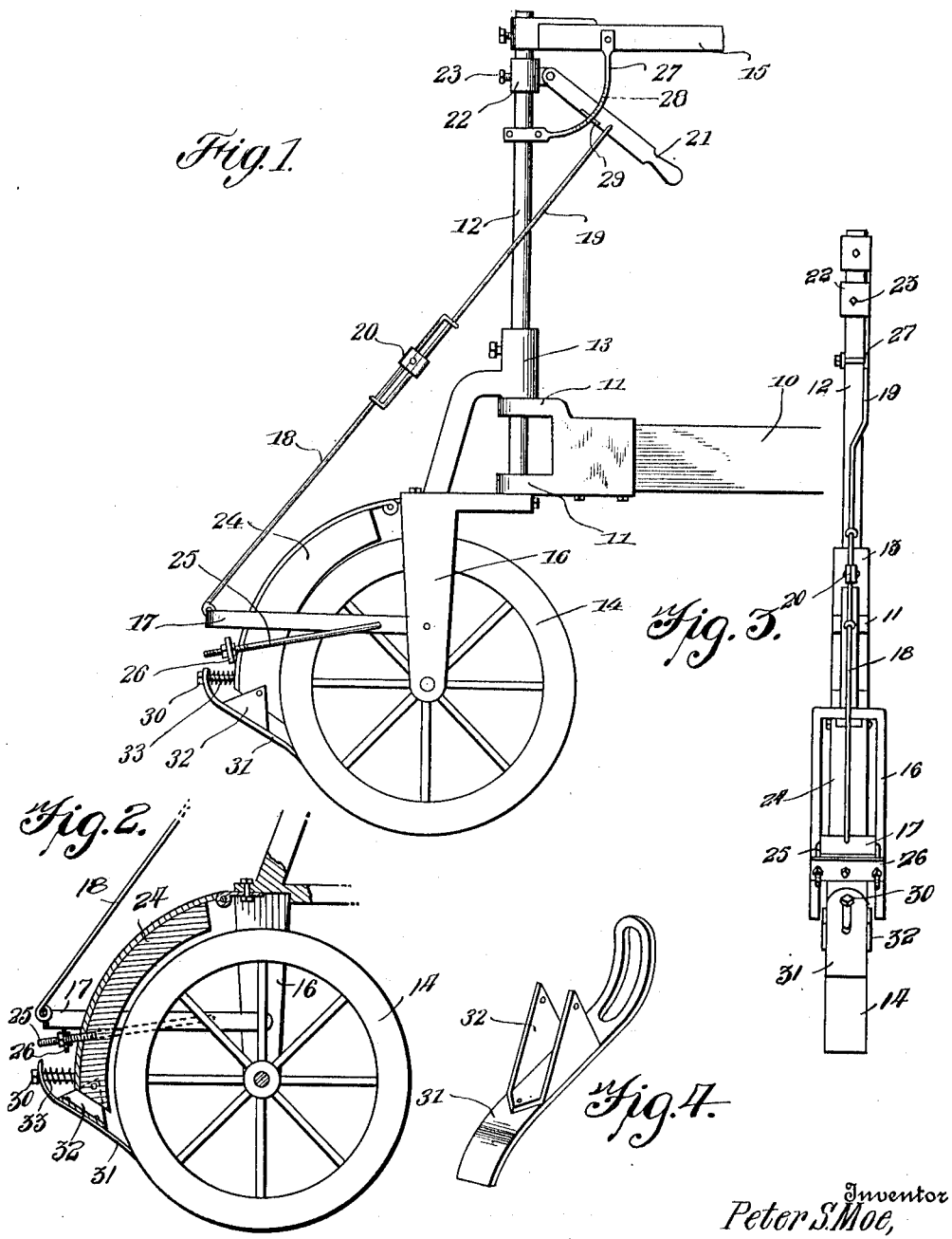

PETER S. MOE, OF CRESTON, WASHINGTON.

BRAKE MECHANISM.

1,022,252.  Specification of Letters Patent.  Patented Apr. 2, 1912.

Application filed May 16, 1911. Serial No. 627,534.

*To all whom it may concern:*

Be it known that I, PETER S. MOE, a citizen of the United States, residing at Creston, in the county of Lincoln and State of Washington, have invented new and useful Improvements in Brake Mechanism, of which the following is a specification.

An object of the invention is to provide a brake mechanism, particularly adaptable for use on agricultural vehicles and the like, provided with rudder wheels, the brake being operable on the rudder wheels to retard the movement of the vehicle.

To accomplish the desired result, use is made of a brake shoe hingedly mounted on the frame of the vehicle and adapted for engagement with the caster wheel thereof, relatively adjustable rods having their inner ends connected, an actuating lever hingedly mounted on the frame of the vehicle and connected with the outer end of one of the said rods, the outer end of the other rod being connected with the said brake shoe and a notched bar mounted on the frame of the vehicle and adapted to be engaged by the said lever for adjustably positioning the said brake shoe relatively to the caster wheel.

Reference is to be had to the accompanying drawings constituting a part of this specification, in which similar characters of reference denote corresponding parts in all the views, and in which—

Figure 1 is a side elevation of my device showing the same applied to the rudder wheel of an agricultural vehicle, the brake shoe being in engagement with the rudder wheel. Fig. 2 is a vertical sectional view showing the brake shoe disengaged from the rudder wheel. Fig. 3 is a rear elevation. Fig. 4 is an enlarged perspective view of the scraper.

Referring more particularly to the views I provide a vehicle frame 10 having secured thereto a plurality of bearing lugs 11 and mounted to turn therein is a wheel rod 12 secured to a frame 13 having revolubly mounted thereon a caster wheel 14, the upper end of the wheel rod 12 having secured thereto a tiller 15 for guiding the caster wheel 14. The frame 13 is provided with depending portions 16 on which the caster wheel 14 is mounted and pivotally mounted on the frame is a U-shaped bar 17 having connected thereto an end of a rod 18. The other end of the rod 18 is looped to encircle a rod 19 also provided with a loop encircling the rod 18 and connected to the said rods is a securing plate 20 for relatively securing the rods in rigid position, an end of the rod 19 being pivotally connected to a lever 21 pivotally mounted on a bearing 22 secured to the wheel rod 12 by a set screw 23. Hingedly mounted at the rear end of the frame 13 is a brake shoe 24, the said brake shoe being adapted to engage the caster wheel 14 in the groove thereof. Pivotally mounted on the U-shaped bar 17 are rearwardly extending rods 25 having their outer ends threaded to receive an apertured plate 26 secured to the brake shoe 24. A notched bar 27 has an end thereof secured to the tiller 15, the other end of the said bar being secured to the wheel rod 12 and the said bar is provided with a series of notches 28 adapted to be engaged by an integral flanged portion 29 on the lever 21.

A screw 30 is secured to the lower end of the brake shoe 24 and depending therefrom is a scraping plate 31, the said plate being provided with flanges 32 secured to the brake shoe 24 and a spring 33 being positioned to encircle the screw 30 and act against the scraper plate 31.

In the operation of my device, when the brake shoe is disengaged from the caster wheel 14 and it is desired to apply the brake shoe the lever 21 is moved upwardly, thus operating the rods to move the outer end of the U-shaped bar 17 upwardly and the rods 25 mounted on the bar 17 and connected to the brake shoe 24 will be moved inwardly, thus pressing the edge of the brake shoe into engagement with the caster wheel 14 so that the rotative movement thereof will be retarded. If it is desired to retain the lever 21 in a particular position, the flange portion 29 is permitted to repose in one of the notches 28 of the notched bar 27, thus rigidly positioning the various parts of my device. To release the brake shoe from engagement with the caster wheel 14 the lever 21 is moved downwardly, thus moving the outer end of the U-shaped bar 17 downwardly and the resulting movement will disengage the brake shoe 24 from the caster wheel 14 as will be readily seen in referring to the figures. The outer end of the scraper plate 31 is normally positioned to engage the caster wheel 14 and act as a means to scrape any accumulation from the groove of the caster wheel.

From the foregoing description it will be readily seen that an efficient and easily operative brake mechanism is provided and the same can be quickly manipulated by the person operating the agricultural vehicle so that the relative speed of the vehicle can be at all times controlled by the operator.

Having thus fully described the invention, what I claim as new, is:—

1. A brake mechanism comprising a U-shaped bar for pivotal engagement with the frame of a vehicle, a rod connected to the said U-shaped bar, a second rod engaging the first rod, means for rigidly securing the said rods, a lever connected with the second rod, a notched bar mounted on the vehicle and adapted to be engaged by the said lever, a brake shoe hingedly mounted on the frame of the vehicle and extending between the said U-shaped bar, a plurality of threaded rods mounted to swing on the said U-shaped bar and a plate for adjustable engagement with the said rods and secured to the said brake shoe, the said brake shoe being adapted to engage or disengage the running gear of the vehicle when the said lever is operated.

2. In a brake mechanism the combination of a vehicle frame, a wheel revolubly mounted on the said frame, a brake shoe hingedly mounted on the frame and adapted for engagement with the said wheel, a U-shaped bar pivotally mounted on the said frame, the said brake shoe being extended between the sides of the said bar, an operating lever mounted on the frame of the said vehicle, a notched bar connected to the frame of the vehicle and adapted to be engaged by the said operating lever to rigidly position the same relatively to the notched bar and rods connecting the said operating lever with the said U-shaped bar for operating the said brake shoe when the said lever is operated.

In testimony whereof I affix my signature in presence of two witnesses.

PETER S. MOE.

Witnesses:
 FRED A. MOE,
 GEO. L. DUNCAN.

---

Copies of this patent may be obtained for five cents each, by addressing the " Commissioner of Patents Washington, D. C."